United States Patent Office 3,087,931
Patented Apr. 30, 1963

3,087,931
N,N' - BIS(PENTAMETHYLENE) AND N,N'-BIS(TETRAMETHYLENE) ISOTHIOURONIUM HALIDES
Henry Tolkmith, Midland, Mich., assignor to The Dow Chemical Company, Midland, Mich., a corporation of Delaware
No Drawing. Filed Dec. 4, 1961, Ser. No. 157,001
6 Claims. (Cl. 260—293.4)

The present invention is directed to isothiouronium halides corresponding to the formula

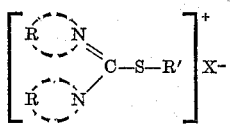

In this and succeeding formulae, R represents tetramethylene or pentamethylene, X represents halogen and R' represents lower alkyl, lower alkenyl and benzyl. In the present specification and claims, the expressions "lower alkyl" and "lower alkenyl" are employed to refer to radicals containing not in excess of 5 carbon atoms. These compounds are crystalline solid materials which are somewhat soluble in many common organic solvents and of relatively high solubility in water and ethanol. The compounds are useful as parasiticides and herbicides and are adapted to be employed for the control of many plant, mite, insect and bacterial and fungal organisms such as worms, beetles, aphids, roaches, ascarids, flies, millet, radish and wild oats.

The novel compounds of the present invention are prepared by reacting N,N'-(thiocarbonyl)dipyrrolidine or N,N'-(thiocarbonyl)dipiperidine with a halide corresponding to the formula R'X. Suitable halides include benzyl bromide, methyl chloride, methallyl chloride, 3-pentenyl chloride, ethyl iodide, butyl bromide, amyl chloride, and 2-butenyl chloride. The reaction conveniently can be carried out in an organic liquid as reaction medium such as ether or nitromethane. The amounts of the reagents to be employed are not critical, some of the desired product being obtained when employing any proportion of the reagents. In the preferred method of operation, good results are obtained when employing substantially equimolecular proportions of the reactants. The reaction takes place smoothly at the temperature range of from 0° to 70° C. with the production of the desired product. In carrying out the reaction, the reactants are mixed and contacted together in any convenient fashion and the resulting mixture maintained for a period of time in the reaction temperature range to insure completion of the reaction. Following the reaction, the reaction mixture is filtered to separate the desired product as a residue. Such products can be further purified by conventional procedures.

The following examples merely illustrate the invention and are not to be construed as limiting.

EXAMPLE 1

*Methyl N,N'-Bis(Pentamethylene)Isothiouronium Iodide*

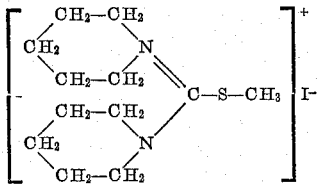

N,N'-(thiocarbonyl)dipiperidine (21 grams; 0.1 mole) and 15 grams (0.106 mole) of methyliodide were dispersed in 250 milliliters of diethyl ether and the resulting mixture heated for three hours at the boiling temperature and under reflux. During the heating a methyl N,N'-bis(pentamethylene)isothiouronium iodide product precipitated in the reaction mixture as a crystalline product. This product was separated by filtration, and the separated product washed with ether. The separated product was found to melt at 86°–87° C. and have iodine and sulfur contents of 34.8 and 9.31 percent, respectively, as compared to theoretical contents of 34.83 and 9.04 percent.

In an exactly similar manner, N,N'-(thiocarbonyl)dipyrrolidine is reacted with methyl bromide to obtain a methyl N,N'-bis(tetramethylene)isothiouronium bromide as a crystalline solid material.

EXAMPLE 2

*Allyl N,N'-Bis(Pentamethylene)Isothiouronium Bromide*

N,N'-(thiocarbonyl)dipiperidine (0.1 mole) and 0.107 mole (13 grams) of allyl bromide were mixed together in 250 milliliters of diethyl ether and the resulting mixture heated with stirring for three hours at the boiling temperature and under reflux. The reaction mixture was thereafter filtered to separate an allyl N,N'-bis(pentamethylene)isothiouronium bromide product as a crystalline solid material. The separated product melted at 134°–136° C. and had bromine and sulfur contents of 23.6 and 9.51 percent, respectively, as compared to theoretical contents of 24.0 and 9.6 percent.

In exactly comparable operations, N,N'-(thiocarbonyl)-dipyrrolidine is reacted with methylallyl chloride to produce a methallyl N,N'-bis(tetramethylene)isothiouronium chloride product as a crystalline solid material.

EXAMPLE 3

*Benzyl N,N'-Bis(Pentamethylene)Isothiouronium Chloride*

N,N'-(thiocarbonyl)dipiperidine (0.1 mole) and 0.103 mole (13 grams) of benzyl chloride were mixed together in 50 milliliters of nitromethane and the resulting mixture heated with stirring for 40 hours at a temperature of from 30° to 50° C. Upon completion of the reaction, the reaction mixture was filtered to obtain a benzyl N,N'-bis(pentamethylene)isothiouronium chloride as a crystalline solid material. This product melted at 52° to 54° C. and had chlorine and sulfur contents of 10.56 and 9.14 percent, respectively, as compared to theoretical contents of 10.5 and 9.44 percent.

In a similar manner, other products of the present invention are prepared as follows:

Butyl N,N'-bis(tetramethylene)isothiouronium chloride by reacting together N,N'-(thiocarbonyl)dipyrrolidine and butyl chloride.

3 - butenyl N,N' - bis(pentamethylene)isothiouronium chloride by reacting together N,N'-(thiocarbonyl)dipiperidine and 3-butenyl chloride.

Amyl N,N'-bis(pentamethylene)isothiouronium bromide by reacting together N,N'-(thiocarbonyl)dipiperidine and amyl bromide.

Benzyl N,N'-bis(tetramethylene)isothiouronium iodide by reacting together N,N'-(thiocarbonyl)dipyrrolidine and benzyl iodide.

Ethyl N,N'-bis(pentamethylene)isothiouronium chloride by reacting together N,N'-(thiocarbonyl)dipiperidine and ethyl chloride.

The new compounds of the present invention are useful as herbicides and parasiticides for the control of a number of plant and parasite species. For such use, the products are dispersed on a finely divided solid and employed as ducts. Also, such mixtures may be dispersed in water with or without the aid of a surface active dispersing agent and the resulting aqueous suspensions employed as sprays. In other procedures, the products are employed as toxic constituents in solvent solutions, oil-in-water or water-in-oil emulsions or aqueous dispersions. In representative operations, the distribution of methyl N,N'-bis(pentamethylene)isothiouronium iodide in soil at a dosage of 50 pounds per acre gives complete kills of millet. In other operations, compositions containing 0.2 percent by weight of the iodide compound give excellent controls of ascarids.

I claim:
1. A compound corresponding to the formula

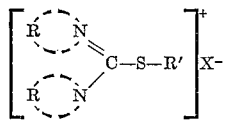

wherein R represents a member of the group consisting of tetramethylene and pentamethylene, X represents halogen and R' represents a member of the group consisting of lower alkyl, lower alkenyl and benzyl.

2. Allyl N,N'-bis(pentamethylene)isothiouronium bromide.

3. Methallyl N,N'-bis(tetramethylene)isothiouronium chloride.

4. Benzyl N,N' - bis(pentamethylene)isothiouronium chloride.

5. Methyl N,N' - bis(tetramethylene)isothiouronium bromide.

6. Methyl N,N' - bis(pentamethylene)isothiouronium iodide.

No references cited.